UNITED STATES PATENT OFFICE.

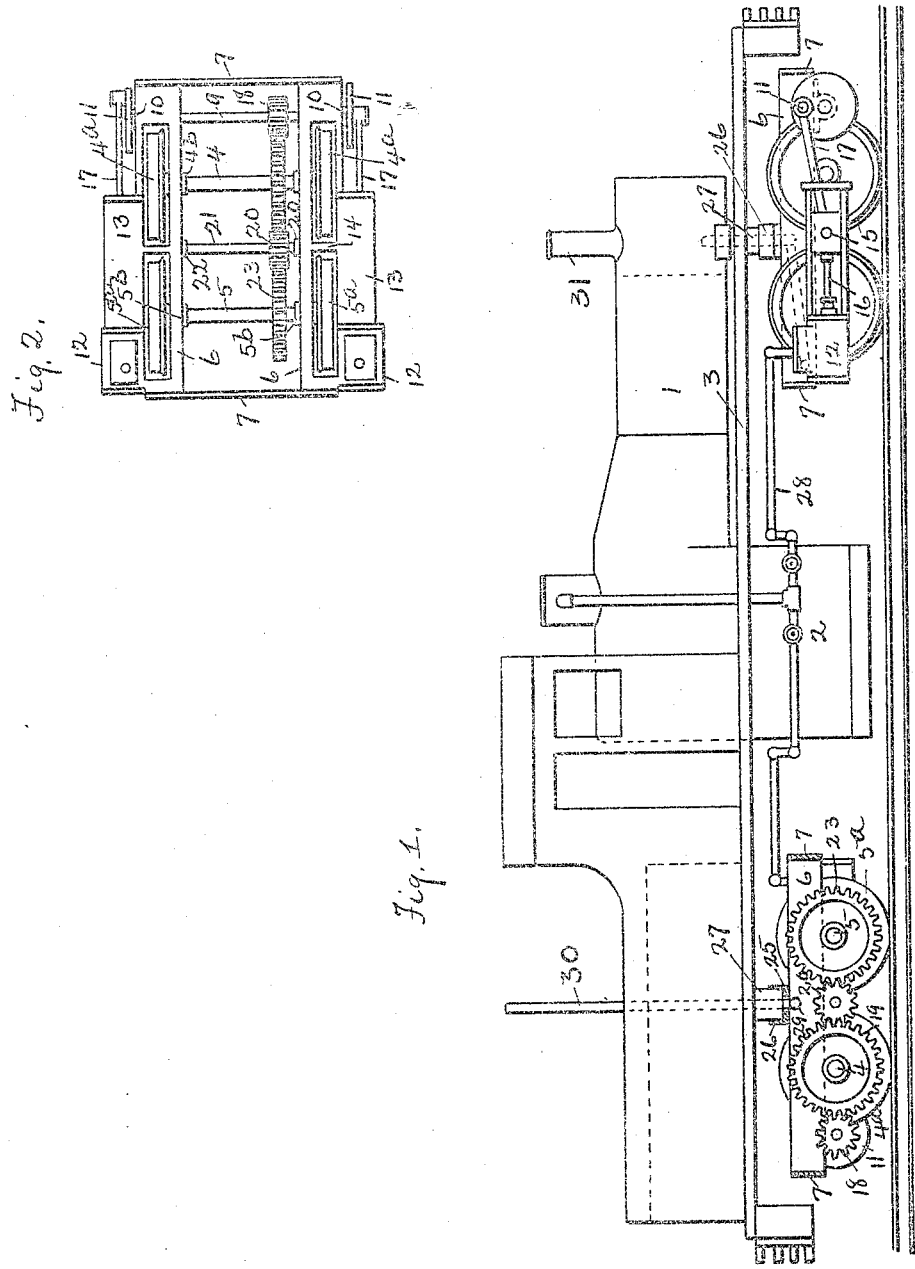

JOHN WALTON, OF ERIE, PENNSYLVANIA.

LOCOMOTIVE.

993,924.

Specification of Letters Patent. Patented May 30, 1911.

Application filed January 23, 1911. Serial No. 604,080.

*To all whom it may concern:*

Be it known that I, JOHN WALTON, a citizen of the United States, residing at Erie, in the county of Erie and State of Pennsylvania, have invented new and useful Improvements in Locomotives, of which the following is a specification.

This invention relates to locomotives and consists in certain improvements in the construction thereof as will be hereinafter fully described and pointed out in the claims.

More particularly, the invention relates to improvements in locomotive trucks.

The object of the invention is to so mount an engine on a geared locomotive truck as to conveniently apply the power and equalize the weight.

The invention is illustrated in the accompanying drawings as follows:

Figure 1 shows an elevation of a locomotive, one of the trucks being in section. Fig. 2 shows an elevation of a truck the bolster being removed.

1 marks the locomotive boiler, 2 the fire box, and 3 the locomotive frame. These are of any ordinary construction.

The truck is provided with the axles 4 and 5, and the wheels 4ª and 5ª are arranged on these axles. The axles are journaled in the bearings 4ᵇ and 5ᵇ in the frame. The frame is made up of the sides 6 connected by the end pieces 7. A crank shaft 9 is journaled in the frame in the bearings 10 and is parallel to the axles. This is arranged at one end of the frame outside of the axles. Cranks 11 are arranged outside the frame.

The engine cylinders 12 are arranged outside the wheels and secured to the side frames. The cross head guides 13 extend from the cylinder and are also secured to the frame by a part of the frame 14 extending between the wheels 4ª and 5ª. The cross head 15 is arranged in the guides 13 and is connected with the usual piston rod 16 and with the crank 11 by the connecting rod 17.

A gear 18 is arranged on the crank shaft. It meshes a gear 19 on the axle 4. The gear 19 meshes a gear 20 on the shaft 21. The shaft 21 is journaled in the bearings 22 on the frame. The gear 20 meshes a gear 23 on the axle 5.

A bolster 25 extends between the side pieces 6 and is mounted in any desirable manner and has the center plate 26 on which the frame center 27 rests. Steam is carried from the boiler to the engine by a pipe 28, this pipe being made flexible in any desired manner and the exhaust is carried by the pipe 29 through the swiveled center of the trucks to an exhaust pipe 30 for the rear truck and to the locomotive stack 31 for the front truck.

My invention does not relate to the boiler, or particularly to the mounting of the boiler, but is directed more particularly to the truck.

By my invention, the cylinders and crank shafts being arranged at opposite ends of the truck, long stroke cylinders may be used with long connecting rods thus reducing the strain on these parts. At the same time, the engine is at the outside so that it is readily accessible to the engineer. The driving connections are simplified because the connected shafts are parallel. This distribution of weight and application of power is of great advantage in locomotives of this type which are subjected to very rough usage and operated on very uneven tracks.

What I claim as new is:

1. In a locomotive, the combination of a locomotive frame and a swiveled truck thereon, said truck comprising two axles, wheels on said axles, a frame carried by said axles, a crank shaft journaled on said frame and extending across the frame outside the axle at one end of the frame, cranks at the ends of the shaft, engines mounted on the frame and operating on the cranks, said engines comprising cylinders mounted at the opposite end of the frame from the shaft and with the axes of the cylinders alongside of and below the top of the wheels on the axles, and a driving connection between the crank shaft and one of the axles.

2. In a locomotive, the combination of a locomotive frame and a swiveled truck thereon, said truck comprising two axles, wheels on said axles, a frame carried by said axles, a crank shaft journaled on said frame and extending across the frame outside the axle at one end of the frame, cranks at the ends of the shaft, engines mounted on the frame and operating on the cranks, said engines comprising cylinders mounted at the opposite end of the frame from the shaft and with the axes of the cylinders alongside of and below the top of the wheels on the axles, a driving connection between the crank shaft and one of the axles, and a driving connection between said axles.

3. In a locomotive, the combination of a locomotive frame and a swiveled truck thereon, said truck comprising two axles, wheels on said axles, a frame carried by said axles, a crank shaft journaled on said frame and parallel to the axle, and extending across the frame outside the axle at one end of the frame, cranks at the ends of the shaft, engines mounted on the frame and operating on the cranks, said engines comprising cylinders mounted at the opposite end of the frame from the shaft and with the axes of the cylinders alongside of and below the top of the wheels on the axles, and a gear connection between the crank shaft and one of the axles.

4. In a locomotive, the combination of a locomotive frame and a swiveled truck thereon, said truck comprising two axles, wheels on said axles, a frame carried by said axles, a crank shaft journaled on said frame and parallel to the axle, and extending across the frame outside the axle at one end of the frame, cranks at the ends of the shaft, engines mounted on the frame and operating on the cranks, said engines comprising cylinders mounted at the opposite end of the frame from the shaft and with the axes of the cylinders alongside of and below the top of the wheels on the axles, a gear connection between said crank shaft and one of the axles, and a gear connection between said axles.

5. In a locomotive, the combination of a locomotive frame and a swiveled truck thereon, said truck comprising two axles, wheels on said axles, a frame carried by said axles, a crank shaft journaled on said frame and extending across the frame outside the axle at one end of the frame, cranks at the end of the shaft, engines mounted on the frame, and operating on the cranks, said engines comprising cylinders mounted at the opposite end of the frame from the shaft, said cylinders being mounted outside of the wheels and with the axes of the cylinders alongside of and below the tops of said wheels, and a driving connection between the crank shaft and one of the axles.

6. In a locomotive, the combination of a locomotive frame: a swiveled truck comprising a frame, two axles journaled in the frame, wheels on said axles, a crank shaft parallel to said axles and arranged at the end of the frame, engines mounted on said frame outside the wheels, the cylinders of said engines being at the opposite end of the frame from the crank shaft and with the axes of the cylinders alongside of and below the tops of said wheels, a spur gear on the crank shaft inside the wheels, a spur gear on one of the axles meshing the gear on the crank shaft, and a driving connection between said axles.

7. In a locomotive, the combination of locomotive frame; a swiveled truck comprising a frame, two axles journaled in the frame, wheels on said axles, a crank shaft parallel to said axles and arranged at the end of the frame, engines mounted on said frame outside the wheels, the cylinders of said engines being at the opposite end of the frame from the crank shaft and with their axes alongside of and below the tops of the wheels, a spur gear on the crank shaft inside the wheels, a spur gear on one of the axles meshing the gear on the crank shaft, a spur gear on the second axle and an intermediate gear between the gears on the axles.

8. In a locomotive, the combination of a locomotive boiler; a tender; a rigid frame for supporting the boiler and tender; a swivel truck arranged under the boiler; a swivel truck arranged under the tender, said trucks each comprising two axles; wheels on the axles; a truck frame carried by the axles; a crank shaft journaled on said frame and extending across the frame outside the axle at one end of the frame; cranks at the end of the shafts; engines mounted on the frame and operating the cranks, said engines comprising cylinders mounted at the opposite end of the frame from the shaft and having their axes alongside of and below the wheels; and a drive connection between the crank shaft and one of the axles.

In testimony whereof I have hereunto set my hand in the presence of two subscribing witnesses.

JOHN WALTON.

Witnesses:
 BLANCHE HARTMAN,
 H. C. LORD.